US012571956B2

(12) United States Patent
Nichol et al.

(10) Patent No.: US 12,571,956 B2
(45) Date of Patent: Mar. 10, 2026

(54) MANUFACTURING A LIGHTGUIDE WITH CUT LATERAL EDGES

(71) Applicant: Azumo, Inc., Chicago, IL (US)

(72) Inventors: Anthony Nichol, Orono, MN (US); Mohammad Azim, Wood Dale, IL (US)

(73) Assignee: Azumo, Inc., Chicago, IL (US)

( * ) Notice: Subject to any disclaimer, the term of this patent is extended or adjusted under 35 U.S.C. 154(b) by 392 days.

(21) Appl. No.: 18/245,434

(22) PCT Filed: Sep. 28, 2021

(86) PCT No.: PCT/US2021/052483
§ 371 (c)(1),
(2) Date: Mar. 15, 2023

(87) PCT Pub. No.: WO2022/072386
PCT Pub. Date: Apr. 7, 2022

(65) Prior Publication Data
US 2023/0358941 A1 Nov. 9, 2023

Related U.S. Application Data

(60) Provisional application No. 63/084,867, filed on Sep. 29, 2020.

(51) Int. Cl.
*G02F 1/1335* (2006.01)
*F21V 8/00* (2006.01)
(52) U.S. Cl.
CPC ......... *G02B 6/0036* (2013.01); *G02B 6/0065* (2013.01); *G02F 1/133616* (2021.01)
(58) Field of Classification Search
CPC .............................................. G02F 1/133616
See application file for complete search history.

(56) References Cited

U.S. PATENT DOCUMENTS

| 2,732,688 A | 1/1956 | Dickson |
| 3,535,537 A | 10/1970 | Powell |
| (Continued) | | |

FOREIGN PATENT DOCUMENTS

| CN | 1206661 | 2/1999 |
| CN | 1341229 A | 3/2002 |
| (Continued) | | |

OTHER PUBLICATIONS

International Search Report and Written Opinion for International Application No. PCT/US2019/48943 dated Nov. 29, 2019.

(Continued)

*Primary Examiner* — Sung H Pak
(74) *Attorney, Agent, or Firm* — Zane Coleman

(57) ABSTRACT

A method of manufacturing a film assembly comprises forming a film-based lightguide with a lightguide region, adding a layer comprising linear light turning features to the film-based lightguide while it is moving in a web direction such that the linear light turning features are oriented in the web direction of the film-based lightguide, and cutting the film-based lightguide while it is moving in a web direction in a plurality of linear sections, the plurality of linear sections comprises linear sections that define lateral edges a light emitting region and/or lateral edges of coupling lightguides extending from the lightguide region, wherein the linear sections are cut at first cut angle between 3 degrees and 25 degrees to a transverse direction of the film-based lightguide orthogonal to the web direction and the thickness direction.

20 Claims, 4 Drawing Sheets

(56) References Cited

U.S. PATENT DOCUMENTS

| | | | |
|---|---|---|---|
| 3,933,556 A | 1/1976 | Strack |
| 4,026,693 A | 5/1977 | Sato |
| 4,141,058 A | 2/1979 | Mizohata et al. |
| 4,151,582 A | 4/1979 | Grunberger |
| 4,228,267 A | 10/1980 | Higashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,592,717 A | 6/1986 | Albert |
| 4,667,481 A | 5/1987 | Watanabe et al. |
| 4,824,194 A | 4/1989 | Karasawa |
| 4,869,570 A | 9/1989 | Yokohama |
| 4,961,617 A | 10/1990 | Shahidi et al. |
| 4,974,354 A | 12/1990 | Hembrook, Jr. |
| 5,001,306 A | 3/1991 | Purcell |
| 5,009,483 A | 4/1991 | Rockwell, III |
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,359,691 A | 10/1994 | Tai et al. |
| 5,379,539 A | 1/1995 | Hannula |
| 5,390,436 A | 2/1995 | Ashall |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,786,665 A | 7/1998 | Ohtsuki et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayers |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,354,724 B1 | 3/2002 | Sakushita |
| 6,361,180 B1 | 3/2002 | Iimura |
| 6,464,365 B1 | 10/2002 | Gunn et al. |
| 6,490,090 B1 | 12/2002 | Kumazawa |
| 6,490,401 B2 | 12/2002 | Corneilissen et al. |
| 6,498,882 B1 | 12/2002 | Buckelew et al. |
| 6,547,445 B2 | 4/2003 | Kiani |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,846,082 B2 | 1/2005 | Glent-Madsen et al. |
| 6,847,424 B2 | 1/2005 | Gotoh et al. |
| 6,933,994 B1 | 8/2005 | Kaneko et al. |
| 6,964,226 B2 | 11/2005 | Weiss et al. |
| 7,004,610 B2 | 2/2006 | Yamashita et al. |
| 7,066,634 B2 | 6/2006 | Kitamura et al. |
| 7,108,414 B2 | 9/2006 | McCollum et al. |
| 7,121,711 B2 | 10/2006 | Yamamoto et al. |
| 7,190,425 B2 | 3/2007 | Hong |
| 7,237,396 B1 | 7/2007 | Nichol |
| 7,275,850 B2 | 10/2007 | Nesterenko |
| 7,343,060 B2 | 3/2008 | Ohtsu et al. |
| 7,384,173 B2 | 6/2008 | Whitney |
| 7,406,245 B2 | 7/2008 | Page et al. |
| 7,411,142 B2 | 8/2008 | Jung et al. |
| 7,413,334 B2 | 8/2008 | Baba |
| 7,413,336 B2 | 8/2008 | Freking et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,542,635 B2 | 6/2009 | Coleman |
| 7,565,054 B2 | 7/2009 | Rinko |
| 7,582,000 B2 | 9/2009 | Pendlebury et al. |
| 7,639,916 B2 | 12/2009 | Fine |
| 7,643,105 B2 | 1/2010 | Yang |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,760,284 B2 | 7/2010 | Murase |
| 7,773,849 B2 | 8/2010 | Shani |
| 7,780,329 B2 | 8/2010 | McCollum et al. |
| 7,810,977 B2 | 10/2010 | Ueyama |
| 7,911,554 B2 | 3/2011 | Oohira |
| 7,949,213 B2 | 5/2011 | Mienko et al. |
| 8,013,831 B2 | 9/2011 | Sampsell |
| 8,016,473 B2 | 9/2011 | Salters |
| 8,098,347 B2 | 1/2012 | Brott et al. |
| 8,128,271 B2 | 3/2012 | Nichol |
| 8,164,703 B2 | 4/2012 | Cheng |
| 8,167,461 B2 | 5/2012 | Nichol |
| 8,231,256 B1 | 7/2012 | Coleman et al. |
| 8,434,909 B2 | 5/2013 | Nichol et al. |
| 8,439,545 B2 | 5/2013 | Cheong et al. |
| 8,714,781 B2 | 5/2014 | Nichol |
| 8,750,671 B1 | 6/2014 | Kelly et al. |
| 8,761,565 B1 | 6/2014 | Coleman et al. |
| 8,764,262 B2 | 7/2014 | Nichol et al. |
| 8,794,809 B2 | 8/2014 | Lundin et al. |
| 8,905,610 B2 | 12/2014 | Coleman et al. |
| 8,917,962 B1 | 12/2014 | Nichol et al. |
| 8,950,902 B2 | 2/2015 | Nichol et al. |
| 8,970,461 B2 | 3/2015 | Tatsuya et al. |
| 9,028,123 B2 | 5/2015 | Nichol et al. |
| 9,103,956 B2 | 8/2015 | Nichol et al. |
| 9,110,200 B2 | 8/2015 | Nichol et al. |
| 9,287,336 B2 | 3/2016 | Lin et al. |
| 9,304,243 B2 | 4/2016 | Wolk et al. |
| 9,523,807 B2 | 12/2016 | Nichol et al. |
| 9,557,473 B2 | 1/2017 | Nichol et al. |
| 9,566,751 B1 | 2/2017 | Nichol et al. |
| 9,645,304 B2 | 5/2017 | Nichol et al. |
| 9,651,729 B2 | 5/2017 | Nichol et al. |
| 9,690,032 B1 | 6/2017 | Nichol et al. |
| 9,798,075 B2 | 10/2017 | Nichol et al. |
| 10,036,847 B2 | 7/2018 | Nichol et al. |
| 10,073,208 B2 | 9/2018 | Nichol et al. |
| 10,175,413 B2 | 1/2019 | Nichol et al. |
| 10,191,199 B2 | 1/2019 | Nichol et al. |
| 10,215,905 B2 | 2/2019 | Nichol et al. |
| 10,254,472 B2 | 4/2019 | Coleman et al. |
| 10,393,941 B2 | 8/2019 | Nichol et al. |
| 10,429,577 B2 | 10/2019 | Coleman et al. |
| 10,466,409 B2 | 11/2019 | Nichol et al. |
| 10,598,848 B2 | 3/2020 | Coleman et al. |
| 10,802,196 B2 | 10/2020 | Nichol et al. |
| 10,935,716 B2 | 3/2021 | Nichol et al. |
| 2001/0019379 A1 | 9/2001 | Ishihara et al. |
| 2001/0019380 A1 | 9/2001 | Ishihara |
| 2002/0015563 A1 | 2/2002 | Murakami |
| 2002/0028600 A1 | 3/2002 | Kondo |
| 2002/0047953 A1 | 4/2002 | Endo |
| 2002/0176035 A1 | 11/2002 | Yamazaki |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0008398 A1 | 1/2004 | Amundson |
| 2004/0017528 A1 | 1/2004 | Kano et al. |
| 2004/0093779 A1 | 5/2004 | Blach |
| 2004/0114342 A1 | 6/2004 | Lin et al. |
| 2004/0119908 A1 | 6/2004 | Sakai |
| 2004/0170373 A1 | 9/2004 | Kim |
| 2004/0228104 A1 | 11/2004 | Birman |
| 2004/0231481 A1 | 11/2004 | Floding et al. |
| 2005/0046921 A1 | 3/2005 | Govil et al. |
| 2005/0072032 A1 | 4/2005 | McCollum et al. |
| 2005/0088830 A1 | 4/2005 | Yumoto et al. |
| 2005/0091886 A1 | 5/2005 | Kim |

US 12,571,956 B2

Page 3

(56)        References Cited

U.S. PATENT DOCUMENTS

2005/0179850 A1   8/2005   Du
2005/0194896 A1   9/2005   Sugita et al.
2005/0219148 A1   10/2005  Bayley et al.
2005/0264730 A1   12/2005  Kataoka et al.
2006/0001037 A1   1/2006   Schardt et al.
2006/0007108 A1   1/2006   Utsumi et al.
2006/0008205 A1   1/2006   Meir et al.
2006/0008225 A1   1/2006   Naitou et al.
2006/0024017 A1   2/2006   Page et al.
2006/0061008 A1   3/2006   Karner et al.
2006/0105149 A1   5/2006   Donahue
2006/0114244 A1   6/2006   Saxena et al.
2006/0120106 A1   6/2006   Kuki et al.
2006/0120681 A1   6/2006   Mune et al.
2006/0207134 A1   9/2006   Harry
2006/0215958 A1   9/2006   Yeo et al.
2006/0269213 A1   11/2006  Hwang
2007/0002578 A1   1/2007   Furusawa et al.
2007/0014110 A1   1/2007   Itaya
2007/0025672 A1   2/2007   Suzuki et al.
2007/0031097 A1   2/2007   Heikenfeld et al.
2007/0035843 A1   2/2007   Casserly
2007/0081344 A1   4/2007   Cappaert et al.
2007/0081360 A1   4/2007   Bailey et al.
2007/0086712 A1   4/2007   Shani
2007/0116424 A1   5/2007   Ting et al.
2007/0133935 A1   6/2007   Fine
2007/0147023 A1   6/2007   Matsushita
2007/0153545 A1   7/2007   Lee
2007/0153548 A1   7/2007   Hamada et al.
2007/0171330 A1   7/2007   Hung
2007/0183730 A1   8/2007   Morimoto et al.
2007/0258267 A1   11/2007  Huang et al.
2007/0274091 A1   11/2007  Inditsky
2007/0279549 A1   12/2007  Iwasaki
2007/0280593 A1   12/2007  Brychell et al.
2007/0286562 A1   12/2007  Inditsky
2008/0007965 A1   1/2008   Kanade et al.
2008/0025039 A1   1/2008   Guillermo
2008/0031579 A1   2/2008   Enami
2008/0037284 A1   2/2008   Rudisill
2008/0043490 A1   2/2008   Coleman et al.
2008/0048366 A1   2/2008   Durney
2008/0075414 A1   3/2008   Van Ostrand
2008/0148753 A1   6/2008   Welker et al.
2008/0159693 A1   7/2008   Chang
2008/0231937 A1   9/2008   Govil et al.
2008/0266863 A1   10/2008  Rinko
2008/0285310 A1   11/2008  Aylward et al.
2009/0028038 A1   1/2009   Harada
2009/0034292 A1   2/2009   Pokrovskiy et al.
2009/0059618 A1   3/2009   Onikiri et al.
2009/0091836 A1   4/2009   Mi et al.
2009/0147535 A1   6/2009   Mienko et al.
2009/0172978 A1   7/2009   Steenblick et al.
2009/0173654 A1   7/2009   Steenblick et al.
2009/0190373 A1   7/2009   Bita et al.
2009/0207632 A1   8/2009   McCollum et al.
2009/0219734 A1   9/2009   Sawada et al.
2009/0257108 A1   10/2009  Gruhlke et al.
2009/0257215 A1   10/2009  Gomi
2010/0014311 A1   1/2010   Danieli
2010/0021109 A1   1/2010   Ohtsu et al.
2010/0021119 A1   1/2010   Ohtsu et al.
2010/0027289 A1   2/2010   Kazuma et al.
2010/0040986 A1   2/2010   Yamaguchi
2010/0053148 A1   3/2010   Khazeni et al.
2010/0067254 A1   3/2010   Ohta
2010/0074585 A1   3/2010   Shimizu et al.
2010/0092143 A1   4/2010   Ushiwata et al.
2010/0109173 A1   5/2010   Yamamoto
2010/0156953 A1   6/2010   Nevitt
2010/0212719 A1   8/2010   Stolum
2010/0214786 A1   8/2010   Nichol
2010/0246200 A1   9/2010   Tessnow et al.
2010/0258419 A1   10/2010  Chung et al.
2011/0032724 A1   2/2011   Kinoshita
2011/0085771 A1   4/2011   Matsuyama et al.
2011/0110638 A1   5/2011   Shioda
2011/0134623 A1   6/2011   Sherman et al.
2011/0164875 A1   7/2011   Bicknell et al.
2011/0176325 A1   7/2011   Sherman et al.
2011/0187964 A1   8/2011   Li et al.
2011/0227487 A1   9/2011   Nichol et al.
2011/0249425 A1   10/2011  Aurongzeb et al.
2011/0255303 A1   10/2011  Nichol et al.
2011/0273901 A1   11/2011  Nichol et al.
2011/0273906 A1   11/2011  Nichol et al.
2011/0277361 A1   11/2011  Nichol et al.
2011/0283576 A1   11/2011  Nichol
2011/0286234 A1   11/2011  Nichol
2012/0212414 A1   8/2012   Osterhout et al.
2012/0229531 A1   9/2012   Yata et al.
2012/0287674 A1   11/2012  Nichol et al.
2013/0038928 A1   2/2013   Padiyath et al.
2013/0148055 A1   6/2013   Chen et al.
2013/0155676 A1   6/2013   Lee
2013/0155723 A1   6/2013   Coleman
2013/0208508 A1   8/2013   Nichol et al.
2013/0250618 A1   9/2013   Nichol et al.
2013/0314942 A1   11/2013  Nichol et al.
2014/0049983 A1   2/2014   Nichol et al.
2014/0056028 A1   2/2014   Nichol et al.
2014/0063853 A1   3/2014   Nichol et al.
2014/0340910 A1   11/2014  Goldstein et al.
2014/0360578 A1   12/2014  Nichol et al.
2015/0049285 A1   2/2015   Qian et al.
2015/0078033 A1   3/2015   Lee et al.
2015/0078035 A1   3/2015   Nichol et al.
2015/0219834 A1   8/2015   Nichol et al.
2015/0253487 A1   9/2015   Nichol et al.
2015/0354781 A1   12/2015  Catalano
2016/0218156 A1   7/2016   Shedletsky et al.
2017/0045669 A1   2/2017   Nichol et al.
2017/0205572 A1   7/2017   Nichol et al.
2017/0235036 A1   8/2017   Nichol et al.
2017/0285243 A1   10/2017  Nichol et al.
2018/0052274 A1   2/2018   Nichol et al.
2018/0059318 A1   3/2018   Nichol et al.
2018/0210131 A1   7/2018   Nichol et al.
2018/0335629 A1   11/2018  Cheng et al.
2018/0348425 A1   12/2018  Coleman et al.
2019/0107665 A1   4/2019   Bu et al.
2019/0170925 A1   6/2019   Nichol et al.
2019/0170928 A1   6/2019   Nichol et al.
2019/0187360 A1   6/2019   Nichol et al.
2019/0235157 A1   8/2019   Coleman et al.
2019/0302327 A1   10/2019  Murata et al.
2020/0310020 A1   10/2020  Sasaki et al.
2021/0080638 A1   3/2021   Nichol et al.
2021/0181405 A1   6/2021   Nichol et al.
2021/0215857 A1   7/2021   Nichol et al.
2021/0294021 A1   9/2021   Romero et al.
2021/0333629 A1   10/2021  Nichol et al.
2022/0179148 A1   6/2022   Coleman et al.
2022/0196903 A1   6/2022   Nichol et al.
2023/0011530 A1   1/2023   Nichol et al.

FOREIGN PATENT DOCUMENTS

CN   1981220 A      6/2007
CN   1981221        6/2007
CN   1985202        6/2007
CN   200962289 Y    10/2007
CN   101140335 A    3/2008
CN   101349400 A    1/2009
CN   101639169 A    2/2010
CN   102681253 A    9/2012
CN   109564304 A    4/2019
DE   2736486 A1     2/1978
EP   284098 A1      9/1988
EP   1760502 A1     3/2007
EP   2103972 A1     9/2009
GB   198085         5/1923

(56) References Cited

FOREIGN PATENT DOCUMENTS

| GB | 662514 | | 12/1951 |
|----|--------|----|---------|
| GB | 2320156 | A | 6/1998 |
| JP | 61-278416 | A | 12/1987 |
| JP | 10-197865 | A | 7/1998 |
| JP | S63301909 | A | 12/1998 |
| JP | 11-264974 | A | 9/1999 |
| JP | 2000-056138 | A | 2/2000 |
| JP | 2000141997 | A | 5/2000 |
| JP | 2000147218 | A | 5/2000 |
| JP | 2000-258633 | | 9/2000 |
| JP | 2001243818 | | 9/2001 |
| JP | 2001266626 | A | 9/2001 |
| JP | 2001305540 | A | 10/2001 |
| JP | 2001-312233 | A | 11/2001 |
| JP | 2002277661 | A | 9/2002 |
| JP | 2004069729 | A | 3/2004 |
| JP | 2004109426 | A | 4/2004 |
| JP | 2004-170972 | A | 6/2004 |
| JP | 2004199967 | A | 7/2004 |
| JP | 2004-288570 | A | 10/2004 |
| JP | 2005043766 | A | 2/2005 |
| JP | 2005340160 | A | 8/2005 |
| JP | 2006-003431 | A | 1/2006 |
| JP | 2006-024561 | | 1/2006 |
| JP | 2006310112 | A | 11/2006 |
| JP | 2007053054 | A | 3/2007 |
| JP | 2007-535790 | A | 12/2007 |
| JP | 2008-198615 | A | 8/2008 |
| KR | 20050113118 | A | 12/2005 |
| KR | 20060057583 | A | 5/2006 |
| WO | 1996011358 | | 4/1996 |
| WO | 2004027314 | A1 | 4/2004 |
| WO | 2006131924 | A2 | 12/2006 |
| WO | 2007081862 | A2 | 7/2007 |
| WO | 2007123180 | A1 | 11/2007 |
| WO | 2007143383 | A2 | 12/2007 |
| WO | 2009048863 | A1 | 4/2009 |
| WO | 2009084176 | A1 | 7/2009 |
| WO | 2009084556 | A1 | 7/2009 |
| WO | 2010005655 | A2 | 1/2010 |
| WO | 2010085787 | A1 | 7/2010 |
| WO | 2011130715 | A2 | 10/2011 |
| WO | 2011130718 | A2 | 10/2011 |
| WO | 2011130720 | A2 | 10/2011 |
| WO | 2012016047 | A1 | 2/2012 |
| WO | 2012068543 | A1 | 5/2012 |
| WO | 2012088315 | A1 | 6/2012 |
| WO | 2012116215 | A1 | 8/2012 |
| WO | 2012122511 | A1 | 9/2012 |
| WO | 2012158460 | A1 | 11/2012 |
| WO | 2018144720 | A1 | 9/2018 |
| WO | 2019090139 | A1 | 5/2019 |
| WO | 2020047340 | A1 | 3/2020 |
| WO | WO-2020123539 | A1 * | 6/2020 | .......... H04N 9/3194 |
| WO | 2020142731 | A1 | 7/2020 |
| WO | 2020146668 | A1 | 7/2020 |
| WO | 2021022307 | A1 | 2/2021 |
| WO | 2022072386 | A1 | 4/2022 |

OTHER PUBLICATIONS

International Search Report and Written Opinion for International Application No. PCT/US2019/065525 dated Feb. 21, 2020.
International Search Report and Written Opinion for International Application No. PCT/US2020/012245 dated Mar. 24, 2020.
International Search Report and Written Opinion for International Application No. PCT/US2020/012977 dated Mar. 20, 2020.
International Search Report and Written Opinion for International Application No. PCT/US2020/070341 dated Oct. 9, 2020.
Suppl Search Report for European Application No. EP19894835.8 dated Jun. 13, 2022.
International Search Report and Written Opinion for International Application No. PCT/US18/059045 dated Jan. 7, 2019.

Suppl Search Report for European Application No. EP20738199.7 dated Jul. 9, 2022.
International Search Report and Written Opinion for PCT/US21/52483 dated Jan. 10, 2022.
Rizzo, et al., "The recovery after bending of polycarbonate sheets." Rheol. Acta 20, 133-138 (1981), ISSN 0035-4511. p. 138, In 1-2.
Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings," Applied Optics, vol. 43, No. 30, Oct. 2004, 5631-5636.
Murata et al., "Input couplers for thin light-guides and light-emitting diodes," Optical Engineering 47(2) , Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films", inventor: Anthony Nichol, and having assigned U.S. Appl. No. 12/682,387. The foregoing U.S. patent application is a continuation of U.S. Appl. No. 12/682,387.
Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 12/682,387. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
International Search Report for International Application No. PCT/US10/22066 dated Mar. 22, 2010.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device,",

(56) References Cited

OTHER PUBLICATIONS inventor: Anthony Nichol. The foregoing U.S. Patent application is a continuation of U.S. Appl. No. 12/682,387.

International Search Report and Written Opinion for International Application No. PCT/US2012/028578 dated Jun. 28, 2012.

Office action dated Nov. 19, 2013 by the China Patent Office for application No. 201180027447.2.

European Search Report and written opinion for European Application No. EP08838526 dated Sep. 19, 2012.

Office action dated Sep. 10, 2012 by the State Intellectual Property Office of China for application No. CN201080005385.0.

International Search Report and Written opinion for International Application No. PCT/US2012/37317 dated Aug. 22, 2012.

Office action dated Dec. 3, 2013 by Japan Patent Office for application No. 2010-528972.

Office action dated Mar. 5, 2013 by the Japan Patent Office for application No. 2010-528972.

Office action dated May 15, 2012 by the USPTO for U.S. Appl. No. 12/682,387.

Office action dated Dec. 23, 2011by the USPTO for U.S. Appl. No. 12/682,387.

Office action dated Jul. 23, 2012 by IP Australia for application No. 2010206525.

Office action dated Nov. 22, 2012 by Instituto Mexicano de la Propiedad Industrial for application MX/a/2011/007770.

Office action dated Dec. 6, 2012 by the USPTO for U.S. Appl. No. 13/088,231.

Notice of allowance dated Jan. 7, 2013 by the USPTO for U.S. Appl. No. 13/089,311.

Buchner, Diplomarbeit: Kinetmatics of 3D Folded Structures for Nanostructured Origami, Department of Mechanical Engineering, 3D optical Systems Group, Massachusetts Institute of Technology, 2003.

Nichol, A.J.; Barbastathis, G., "Sub-30nm alignment accuracy between layered photonic nanostructures using optimized V nanomagnet arrays," Optical MEMs and Nanophotonics, 2008 IEEE/LEOS International Conference on , vol. No. , pp. 9,10, Aug. 11-14, 2008.

Arora et al., "Membrane folding to achieve three-dimensional nanostructures: Nanopatterned silicon nitride folded with stressed chromium hinges," Appl. Phys. Lett. 88, 053108 (Jan. 2006).

"Nanostructured Origami Folding of Patternable Resist for 3D Lithography ""Se Young Yang, Hyung-ryul Johnny Choi, Martin Deterre, George Barbastathis,"" IEEE 2010 International Conference on Optical MEMS & Nanophotonics, p. 37-38, Aug. 2010".

Notice of allowance dated Jul. 29, 2013 by the China Patent Office for application No. 201080005385.0.

Office action dated Jun. 20, 2013 by Instituto Mexicano de la Propiedad Industrial for application MX/a/2012/012033.

Office action dated Jun. 26, 2013 by Instituto Mexicano de la Propiedad Industrial for application MX/a/2012/012034.

Office action dated Jun. 26, 2013 by Instituto Mexicano de la Propiedad Industrial for application MX/a/2012/012035.

Office action dated Oct. 15, 2013 by the China Patent Office for application No. 201180027439.8.

* cited by examiner

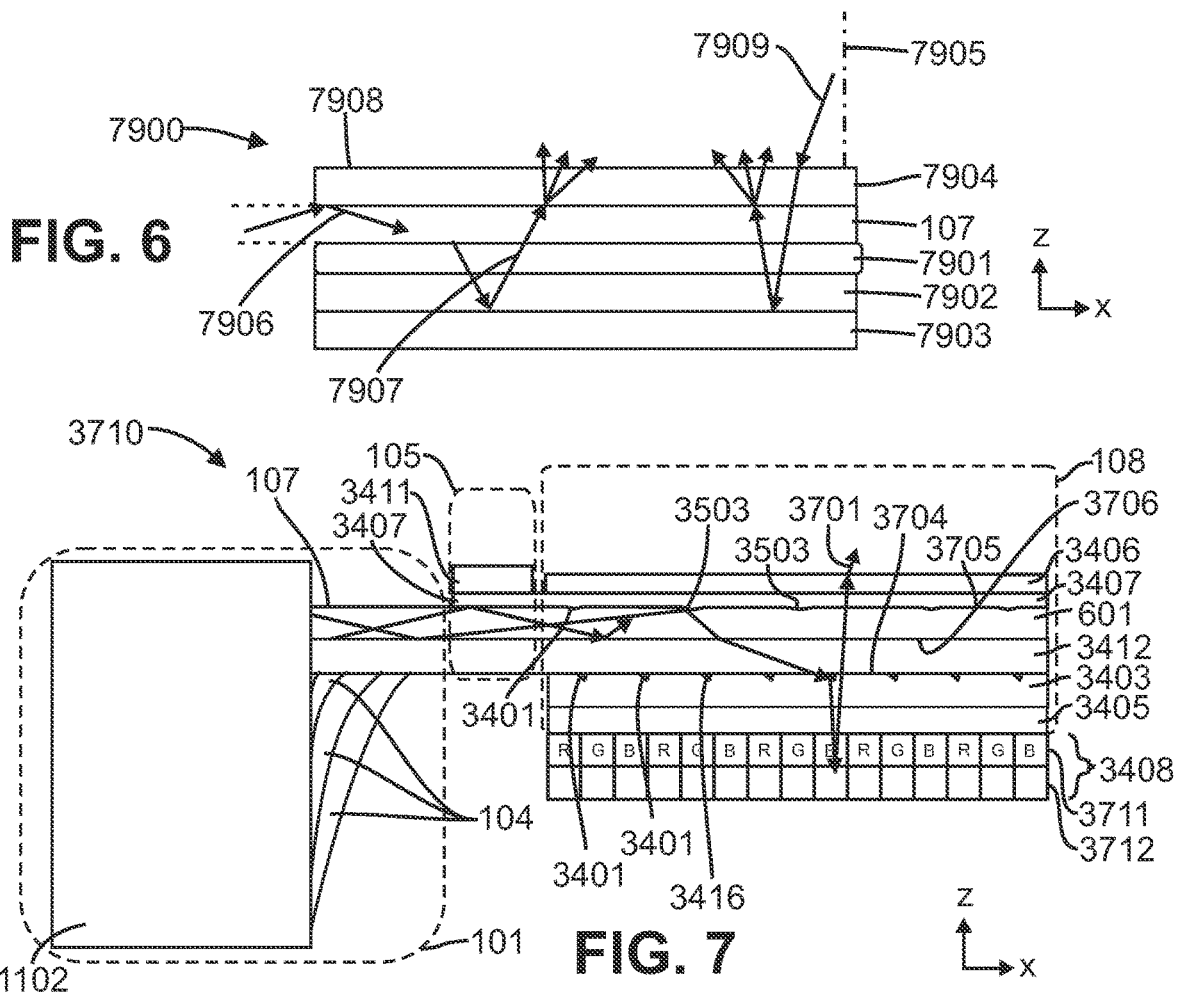
FIG. 6
FIG. 7
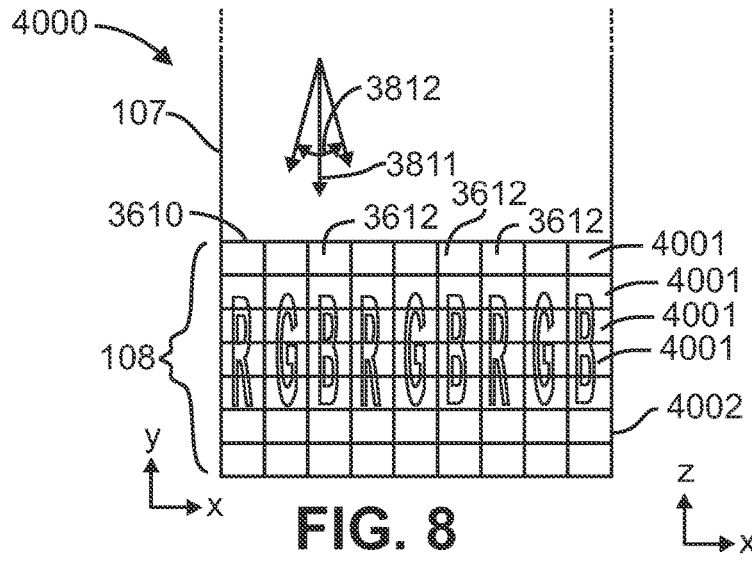
FIG. 8

MANUFACTURING A LIGHTGUIDE WITH CUT LATERAL EDGES

TECHNICAL FIELD

The subject matter disclosed herein generally relates to lightguides, films, and light emitting devices such as, without limitation, frontlights, passive displays, and active displays and their components and methods of manufacture.

BACKGROUND ART

Light emitting devices are needed that have a very thin form factor that can generate light with specific angular light output profiles. Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

A method of manufacturing a film assembly comprises forming a film-based lightguide with a lightguide region, adding a layer comprising linear light turning features to the film while the film is moving in a web direction of the film-based lightguide such that the linear light turning features are oriented in the web direction of the film-based lightguide, and cutting the film-based lightguide while the film-based lightguide is moving in a web direction in a plurality of linear sections, the plurality of linear sections comprises linear sections that define lateral edges a light emitting region or lateral edges of coupling lightguides extending from the lightguide region of the film-based lightguide, wherein the linear sections are cut at first cut angle between 3 degrees and 25 degrees to a transverse direction of the film-based lightguide orthogonal to the web direction and the thickness direction.

In another aspect, a film assembly comprises a film-based lightguide comprising a lightguide region and having opposing faces with a thickness in a thickness direction between the opposing faces less than 0.5 millimeters, a layer comprising linear light turning features oriented in a web direction of the film-based lightguide, and a plurality of cut linear sections comprising cut linear sections that define lateral edges of coupling lightguides extending from the lightguide region of the film-based lightguide, wherein the plurality of cut linear sections are cut at first cut angle between 3 degrees and 25 degrees to a transverse direction orthogonal to the web direction and the thickness direction.

The first cut angle may be an angle between 5 and 15 degrees or 7 and 13 degrees to the transverse direction. The plurality of linear sections may comprise linear sections cut at the first cut angle that define lateral edges of a light emitting region of the film-based lightguide comprising light extraction features or define lateral edges of a light mixing region of the film-based lightguide between the light emitting region and the coupling lightguides. The film assembly may comprise an adhesive layer positioned between the film-based lightguide and the layer comprising linear light turning features and cutting the film-based lightguide and layer further cuts the adhesive layer. In one aspect, adding a layer comprising linear light turning features comprises adhering the layer to the film-based lightguide using the adhesive layer. In one aspect, a frontlight comprises the film assembly and at least one light source positioned to emit light into the film-based lightguide that propagates in the film-based lightguide by total internal reflection. In another aspect, a reflective display comprising the frontlight with the film assembly and a reflective spatial light modulator, wherein the lateral edges of the light emitting region are parallel to a side of the reflective spatial light modulator. In another aspect, a reflective display comprises the film assembly wherein the film assembly is adhered to a reflective spatial light modulator such that the linear light turning features are oriented at the first cut angle to one or more sides of the reflective spatial light modulator.

BRIEF DESCRIPTION OF THE DRAWINGS

FIG. 6 is a side view of a portion of a reflective display comprising a film-based lightguide and angularly varying diffusing film.

FIG. 7 is a cross-sectional side view of one embodiment of a light emitting device comprising a film-based lightguide and a reflective spatial light modulator comprising an array of linear color filters.

FIG. 8 is a top view of a portion of a front-lit reflective display comprising a color filter layer comprising a linear array of color filters arrayed in the x direction, a film-based lightguide frontlight comprising a film-based lightguide, and a reflective spatial light modulator.

DETAILED DESCRIPTION OF EMBODIMENTS

Figure 1:
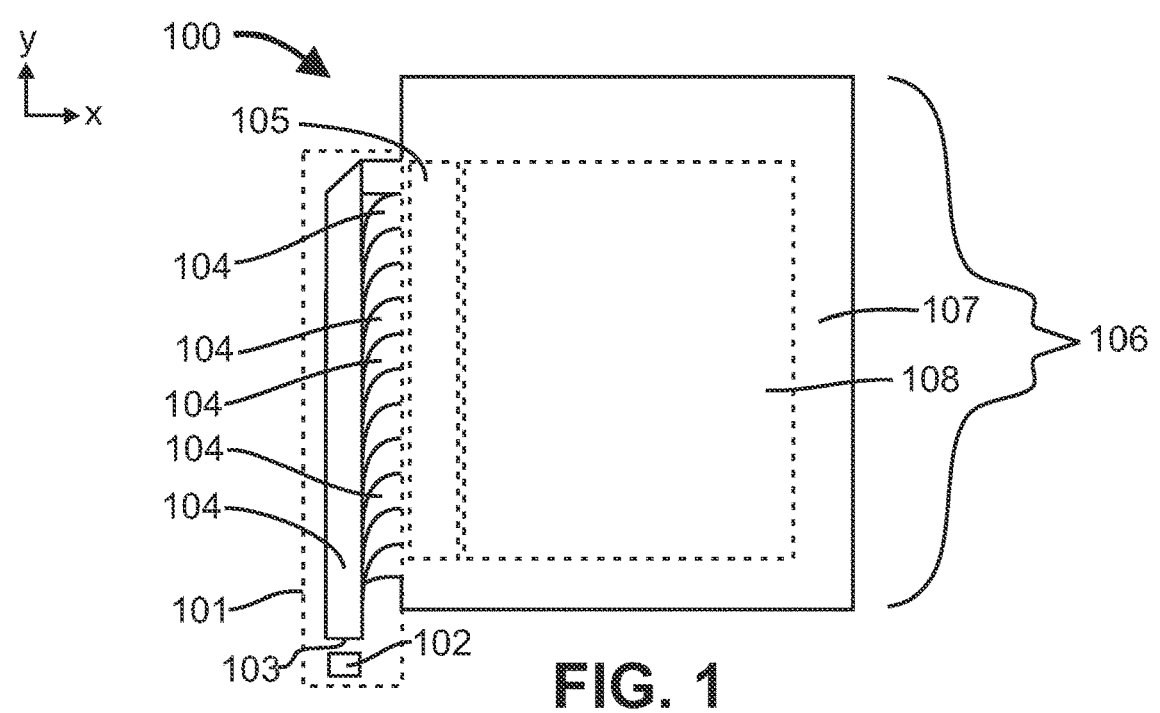
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent display" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any surface (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5-micrometer region or layer of a film or it may be a 3 millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. With respect to the optical axis of light propagating within an element of the light emitting device, such as a light collimating optical element or angular rotation optical element, the optical axis is in the direction of peak intensity of the propagating light within the element. The optical axis can be the average or general direction of light propagation toward the next element or surface to ultimately reach the light emitting region of the film-based lightguide.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one surface or edge of the core material with a refractive index less than a refractive index of the core material. In other embodiment, the light input coupler includes a plurality of coupling lightguides wherein a portion of light from a light source incident on a surface of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

Light Redirecting Optical Element

In one embodiment, a light redirecting optical element is disposed to receive light from at least one light source and redirect the light into a plurality of coupling lightguides. In another embodiment, the light redirecting optical element is at least one selected from the group: secondary optic, mirrored element or surface, reflective film such as aluminized PET, giant birefringent optical films such as Vikuiti™ Enhanced Specular Reflector Film by 3M Inc., curved mirror, totally internally reflecting element, beamsplitter, and dichroic reflecting mirror or film.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermo-formed optical lens, and a cross-linked lens made from a mold. In another embodiment, the light collimating element reduces the angular full-width at half maximum (FWHM) intensity within the input plane and a plane orthogonal to the input plane.

In one embodiment, a light emitting device includes a light input coupler and a film-based lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

In one embodiment, the collimation or reduction in angular FWHM intensity of the light from the light collimating element is substantially symmetric about the optical axis. In one embodiment, the light collimating optical element receives light from a light source with a substantially symmetric angular FWHM intensity about the optical axis greater than one selected from the group: 50, 60, 70, 80, 90, 100, 110, 120, and 130 degrees and provides output light with an angular FWHM intensity less than one selected from the group: 60, 50, 40, 30, and 20 degrees from the optical axis. For example, in one embodiment, the light collimating optical element receives light from a white LED with an angular FWHM intensity of about 120 degrees symmetric about its optical axis and provides output light with an angular FWHM intensity of about 30 degrees from the optical axis.

The angular full-width at half maximum intensity of the light propagating within the lightguide can be determined by measuring the far field angular intensity output of the lightguide from an optical quality end cut normal to the film surface and calculating and adjusting for refraction at the air-lightguide interface. In another embodiment, the average angular full-width at half maximum intensity of the extracted light from one or more light extraction features or light extraction regions including light extraction features of the film-based lightguide is less than one selected from the group: 50 degrees, 40 degrees, 30 degrees, 20 degrees, 10 degrees, and 5 degrees. In another embodiment, the peak angular intensity of the light extracted from the light extraction feature is within 50 degrees of the surface normal of the lightguide within the region. In another embodiment, the far-field total angular full-width at half maximum intensity of the extracted light from the light emitting region of the film-based lightguide is less than one selected from the group: 50 degrees, 40 degrees, 30 degrees, 20 degrees, 10 degrees, and 5 degrees and the peak angular intensity is within 50 degrees of the surface normal of the lightguide in the light emitting region.

Coupling Lightguides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling light-guides) of a planar film has dimensions of a rectangle that is 3 millimeters by 2.7 millimeters and the light input coupler couples light into a planar section of a film in the light mixing region with cross-sectional dimensions of 40.5 millimeters by 0.2 millimeters. In one embodiment, the extended direction of one or more coupling lightguides is the direction in which the one or more coupling lightguides extend from a common base area.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that the longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling light guide. In one embodiment, the lateral edges are at least one selected from the group: uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment, the edges are coated with a specularly reflecting ink including nano-sized or micrometer-sized particles or flakes which substantially reflect the light in a specular manner when the coupling lightguides are brought together from folding or bending. In another embodiment, a light reflecting element (such as a multi-layer mirror polymer film with high reflectivity) is disposed near the lateral edge of at least one region of a coupling lightguide disposed, the multi-layer mirror polymer film with high reflectivity is disposed to receive light from the edge and reflect it and direct it back into the lightguide. In another embodiment, the lateral edges are rounded, and the percentage of incident light diffracted out of the lightguide from the edge is reduced. One method of achieving rounded edges is by using a laser to cut the strips, segments or coupling lightguide region from a film and edge rounding through control of the processing parameters (speed of cut, frequency of cut, laser power, etc.). Other methods for creating rounded edges include mechanical sanding/polishing or from chemical/vapor polishing. In another embodiment, the lateral edges of a region of a coupling lightguide are tapered, angled, serrated, or otherwise cut or formed such that light from a light source propagating within the coupling lightguide reflects from the edge such that it is directed into an angle closer to the optical axis of the light source, toward a folded or bent region, or toward a lightguide or lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region.

Interior Light Directing Edge

In one embodiment, the interior region of one or more coupling lightguides, light mixing region, lightguide region, or light emitting region includes one or more interior light directing edges. The interior light directing edge may be formed by cutting or otherwise removing an interior region of the coupling lightguide, light mixing region, lightguide region, or light emitting region. In one embodiment, the interior light directed edge redirects a first portion of light within the coupling lightguide, light mixing region, lightguide region, or light emitting region. In one embodiment, the interior light directing edges provide an additional level of control for directing the light within the coupling lightguides, light mixing region, lightguide region, or light emitting region and can provide light flux redistribution within the coupling lightguide, light mixing region, lightguide region and/or within the light emitting region to achieve a predetermined light output pattern (such as higher uniformity or higher flux output) in a specific region.

In one embodiment, at least one interior light directing edge is positioned within a coupling lightguide, the light mixing region, lightguide region, or light emitting region to receive light propagating within the coupling lightguide, light mixing region, lightguide region, or light emitting region, respectively, within a first angular range from the optical axis of light traveling within the coupling lightguide or region and direct the light to a second, different angular range propagating within the coupling lightguide or region.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, $n_m$, of the surface to which it is optically coupled. In a one embodiment, the average thickness of one or both cladding layers of the lightguide is less than one selected from the group: 100 micrometers, 60 micrometers, 30 micrometers, 20 micrometers, 10 micrometers, 6 micrometers, 4 micrometers, 2 micrometers, 1 micrometer, 0.8 micrometers, 0.5 micrometers, 0.3 micrometers, and 0.1 micrometers. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide, and the cladding material is not disposed on one or more coupling lightguides.

In one embodiment, the cladding is one selected from the group: methyl-based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide and the cladding material is not disposed on one or more coupling lightguides.

Lightguide Configuration and Properties

In one embodiment, the thickness of the film, light redirecting optical element, reflective display, lightguide, and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Refractive Index of the Light Transmitting Material

In one embodiment, the core material of the lightguide has a higher refractive index than the cladding material. In one embodiment, the core is formed from a material with a refractive index $(n_D)$ greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index $(n_D)$ of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes.

Thickness of the Lightguide

In one embodiment, the thickness of the film, lightguide, lightguide region, and/or light emitting region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, greater than 90% of the entire thickness of the film, a lightguide, and a lightguide region is less than 0.2 millimeters. In one embodiment, the separation between the two surfaces of the core layer or region of the lightguide in the light emitting region deviates from the average separation by less than one selected from the group of 30%, 20%, 10%, and 5% of the average separation. In another embodiment, the separation distance between the two surfaces defining the total internal reflection surfaces for the lightguide within the light emitting region deviates from the average separation distance by less than one selected from the group of 30%, 20%, 10%, and 5% of the average separation distance. In one embodiment, the average angle between the two surfaces defining the total internal reflection surfaces for the lightguide within the light emitting region is less than one selected from the group of 10, 8, 6, 5, 4, 3, 2, 1 and 0.5 degrees.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micrometer long, 45-degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material.

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting optical element using an adhesive that functions as a cladding with a refractive index of about 1.42.

In one embodiment, a light emitting device comprises a film-based lightguide comprising a core layer having opposing surfaces with a thickness not greater than about 0.5 millimeters therebetween wherein light propagates by total internal reflection between the opposing surfaces; a first cladding layer having a first side optically coupled to the core layer and an opposing second side; an array of coupling lightguides continuous with a lightguide region of the lightguide, each coupling lightguide of the array of coupling lightguides terminates in a bounding edge, and each coupling lightguide is folded in a fold region such that the bounding edges of the array of coupling lightguides are stacked; a light emitting region comprising a plurality of light extraction features arranged in a pattern that varies spatially in the light emitting region, the plurality of light extraction features frustrate totally internally reflected light propagating within the core layer such that light exits the core layer in the light emitting region into the first cladding layer; a light source positioned to emit light into the stacked bounding edges, the light propagating within the array of coupling lightguides to the lightguide region, with light from each coupling lightguide combining and totally internally reflecting within the lightguide region; a light redirecting optical element optically coupled to the second side of the first cladding layer, the light redirecting optical element comprising light redirecting features that direct frustrated totally internally reflected light from the light extraction features toward the reflective spatial light modulator, the light redirecting features occupy less than 50% of a surface of the light redirecting optical element in the light emitting region, and wherein the core layer has an average thickness in the light emitting region, the light emitting region has a largest dimension in a plane of the light emitting region orthogonal to the thickness direction of the core layer, the largest dimension of the light emitting region divided by the average thickness of the core layer in the light emitting region is greater than 100, the light extraction features are low angle directing features, the light exiting the light source has a first full angular width at half maximum intensity in a plane orthogonal to the thickness direction of the film, the light exiting the light emitting device has second full angular width at half maximum intensity in a second plane parallel to the thickness direction and a third full angular width at half maximum intensity in a third plane parallel to the thickness direction of the film and orthogonal to the second plane. In one embodiment, the first full angular width at half maximum intensity is less than one selected from the group: 1, 2, 5, 7, 10, 15, 20, 25, 30, 35, 40, 45, and 50 degrees. In another embodiment, the second full angular width at half maximum intensity is less than one selected from the group: 1, 2, 5, 7, 10, 15, 20, 25, 30, 35, 40, 45, and 50 degrees. In another embodiment, the third full angular width at half maximum intensity is less than one selected from the group: 1, 2, 5, 7, 10, 15, 20, 25, 30, 35, 40, 45, and 50 degrees. In another embodiment, the first, second, and third full angular widths are each less than one selected from the group 1, 2, 5, 7, 10, 15, 20, 25, 30, 35, 40, 45, and 50 degrees. In one embodiment, the light exiting the light source has a full angular width at half maximum intensity in a plane parallel to the thickness direction of the film greater than the first full angular width. For example, in one embodiment, a light source is substantially collimated in a plane perpendicular to the thickness direction of the lightguide, film, or stack of coupling lightguides, in the light emitting region (or has a first angular width at half maximum intensity less than 10 degrees) and is not collimated or has a larger full angular width at half maximum intensity in the plane parallel to the thickness direction of the film or stack of coupling lightguides. In one embodiment, light from the light sources passes through the coupling lightguides and into the lightguide region, it is redirected by the low angle directing features, passes through the first cladding layer, is redirected by the light redirecting optical element and exits the light emitting device with second angular full width at half maximum intensity that can be low (such as less than 10 degrees) due to the collimation of the light source output (such as by a primary and/or secondary lens or reflector) and a third angular full width at half maximum intensity that can be low (such as less than 10 degrees) due to the collimation from the combination of the low angle directing features, the difference in refractive index between the two cladding layers, and the light redirecting features of the light redirecting optical element.

Reflecting Low Angle Directing Features

In one embodiment, a film-based lightguide comprises a light emitting region with low angle directing features defined by angled or curved interfaces between materials with two different refractive indexes. In this embodiment, the refractive index difference can cause at least a portion of the incident light to be reflected with an average total angle of deviation less than 20 degrees from the angle of incidence. In one embodiment, light propagating within a core region of a lightguide of a first core material with a first core refractive index adjacent a region with a second refractive index less than the first refractive index interacts and reflects from angled surface features embossed into the first core material such that at least a portion of the incident light is reflected with an average total angle of deviation less than 20 degrees from the angle of incidence. In one embodiment, the reflection at the angled or curved surface feature is a total internal reflection. For example, in one embodiment, a film-based lightguide comprises a light emitting region with low angle directing features defined by an arrangement of linear surface features angled at an average of 4 degrees from the direction parallel to the film surface (or core region layer interface) in the light emitting region (an average of 86 degrees from the surface normal of the film in the light emitting region). In this example, the surfaces can be formed (such as by scribing or embossing) in the core layer of material and a material with a lower refractive index may be positioned adjacent the surface such that a portion of the light incident on the surface is reflected (low angle directed) at a total angle of deviation of 8 degrees.

Refractive Low Angle Directing Features

In another example, a film-based lightguide comprises a light emitting region with low angle directing features defined by an arrangement of surfaces wherein light passing through the surface is refracted (and optionally reflected) at least once to a new angle with an average total angle of deviation less than 20 degrees from the angle of incidence. In this example, the surfaces can be formed in the core layer of material and have a material with a lower refractive index adjacent the surface such that a portion of the light incident on the surface is refracted (low angle directed) at the interface, passes through the lower refractive index material and reflects off a second interface, passes back through the lower refractive index material and back through the lightguide where it may escape the lightguide at the opposite surface interface and be subsequently redirected by light turning features.

Diffracting Low Angle Directing Features

In another example, a film-based lightguide comprises a light emitting region with low angle directing features defined by an arrangement of diffractive features or surfaces wherein light passing through the features or surfaces is diffracted (and optionally reflected) at least once to a new angle with an average total angle of deviation less than 20 degrees from the angle of incidence.

For example, in one embodiment, one surface of the film-based lightguide in the light emitting region of the film comprises binary gratings or blazed diffraction gratings that redirect light incident at a first angle within a first wavelength bandwidth to a second angle different from the first angle with an average total angle deviation less than 20 degrees from the angle of incidence. In one embodiment, the pitch, size, length size, depth, or angle of the one or more diffractive features or surfaces varies in a first direction from the first side of the light emitting region to the opposite side in the direction of light propagation within the light emitting region. For example, in one embodiment, the core region of the lightguide in the light emitting region comprises diffraction gratings with a repeating array of first, second, and third pitches configured to diffract the average angle of incident light into average total angle deviations less than 20 degrees for blue, green, and red light, respectively.

Scattering Low Angle Directing Features

In a further example, a film-based lightguide comprises a light emitting region with low angle directing features defined by a layer or region with light scattering features, domains, or particles wherein light passing through the light scattering layer or region is scattered at least once to a new angle with an average total angle of deviation less than 20, 15, 10, 8, 6, 4, 3, 2, or 1 degrees from the angle of incidence. In one embodiment, the light scattering layer or region can be formed adjacent, above, below, or within a region of the core layer of material. In this example, the light scattering layer or region may comprise or be defined by a light scattering interface with a regular or irregular surface structure on a first material with a first refractive index in contact with a second surface of a second material conforming to the first material surface with a lower or higher refractive index than the first material such that a portion of the light incident on the interface is scattered (forward and/or back scattering) such that it escapes the lightguide at a surface interface and is subsequently redirected by light turning features. In another embodiment, the film-based lightguide comprises low angle scattering features defined by a dispersed phase of a first material in a second matrix material (such as dispersed beads within a coating matrix). In this embodiment, the light incident scatters or refracts from one or more domain-matrix interfaces such that the average total angle of deviation of the incident light is less than 20 degrees from the angle of incidence. In one embodiment, the low angle directing features progressively redirect light such that the light is deviated into an angle such that all or a portion of the light escapes the total internal reflection condition within the lightguide.

Polarization Dependent Low Angle Directing Features

In one embodiment, the low angle directing features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light and the second polarization is p-polarized light. In one embodiment, the low angle directing features or surface, or a material optically coupled to the low angle directing features or surface comprise a substantially isotropic material, a birefringent material, or a trirefringent material. In one embodiment, a structured low angle directing feature in a birefringent material is used to redirect light of a first polarization such that the average total angle of deviation of the incident light is less than 20 degrees from the angle of incidence. For example, in one embodiment, light of the first polarization, such as s-polarized light, is directed into a low angle such that it is at an angle less than the critical angle for the side of the lightguide optically coupled to the cladding layer with a higher refractive index than the cladding layer on the opposite side. Thus, in this example, light of the desired polarization state, s-polarized light, is preferentially extracted by the low angle directing features. In another embodiment, one or more layers or regions optically coupled to the lightguide comprises a waveplate, birefringent material, trirefringent material, or anisotropic material that converts light remaining in the lightguide into the desired polarization state such that it can be redirected through a second or subsequent interaction with the polarization dependent low angle directing feature.

Light Turning Features

In one embodiment, the light emitting region of the lightguide comprises or is optically coupled to a layer or region with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region. For example, in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region where it further passes through the lightguide to illuminate an object, such as a reflective LCD, and may optionally pass back through the lightguide. In one embodiment, the light turning features receive light from the low angle directing features and redirect the light into an angle less than 30 degrees from the thickness direction in the light emitting region. The light turning feature may be formed on a surface or within a volume of material and the material may be thermoplastic, thermoset, or adhesive material. In one embodiment, the light turning features are embossed (UV cured or thermomechanically embossed) surface features in a light turning film that is optically coupled (such as by using a pressure sensitive adhesive) to the film-based lightguide in the light emitting region. In another embodiment, the light turning film or region or layer comprising the light turning features extends into less than one selected from the group of 30%, 20%, 10%, and 5% of the light mixing region of the film-based lightguide.

Film Covering Light Turning Features Creating Air Gaps

In one embodiment, a light turning film comprising light turning features on a first surface of the film is optically coupled to the lightguide on the second surface opposite the first surface, the light turning features comprise recessed regions or grooves in the first surface, and the first surface is adhered to a second film in regions between the recessed regions or grooves using a pressure sensitive adhesive that leaves an air gap in the recessed region or grooves. In this embodiment, the large refractive index difference between the polymer light turning film and the air within the recessed region or grooves increases the percentage of totally internally reflected light at the interface over that of an adhesive that effectively planarizes the surface by filing in the recessed regions or grooves with the adhesive. The second film covering the light turning features may be a cover layer, adhered or laminated (such as by a pressure sensitive adhesive) to the film or layer comprising the light turning features, that is one or more selected from the group: protective PET film, touchscreen film, film comprising a hardcoat, protective glass layer, polarizer or substrate of a polarizer, linear polarizer, circular polarizer, anti-glare film, anti-reflection film, protective lens, protective substrate, protective sheet, varying angle diffuser film, and protective film. In one embodiment, a front lit reflective display comprises a reflective LCD with a film-based frontlight (such as a configuration disclosed elsewhere herein) optically coupled to the top of the reflective LCD, a film or layer with light turning features, and a cover layer covering the light turning features that is a linear polarizer adhered (such as by a pressure sensitive adhesive) to the film or layer comprising the recessed regions forming the light turning features, wherein the polarization axis of the linear polarizer is aligned with the polarization axis of the top linear polarizer (the polarizer on the viewing side of the reflective LCD). In another embodiment, a front lit reflective LCD comprises one or more layers between the top polarizer of the reflective LCD that rotates the polarized modulated light from the reflective LCD and the cover layer covering the light turning features is a circular polarizer adhered (such as by a pressure sensitive adhesive) to the film or layer comprising the recessed regions forming the light turning features with the quarter wave plate portion of the circular polarizer positioned between the linear polarizer portion of the circular polarizer and the light turning features. In this embodiment, one or more film or layers, such as a lightguide, adhesive, touchscreen film or layer, protective film, cladding layer or film may rotate the polarization, such as by a quarter wave, such that the circular polarizer rotates the polarization by another quarter wave and the linear polarizer, optically coupled to the film or layer comprising the light turning features, is oriented with its polarization axis substantially orthogonal to the polarization axis of the top polarizer of the LCD. In a further embodiment, a reflective display comprises a film-based lightguide positioned between a top polarizer of a reflective LCD and the liquid crystal material of the reflective LCD (such as laminating the lightguide (optionally comprising light turning features and low angle directing features) to the top substrate of the reflective LCD and laminating the top polarizer to layer comprising recessed light turning features using pressure sensitive adhesive layers). In this embodiment, any depolarization or contrast reducing effects, such as from scattering or undesired reflections, may be reduced by putting the top polarizer above the frontlight (comprising the film-based lightguide and optionally other films, layers, or features disclosed herein).

Size and Shape of the Light Turning Features

In one embodiment, a light emitting device comprises the film-based lightguide providing front illumination, such as a frontlight for a reflective display, and the density of the light turning features in the light emitting region of the film (or in a film optically coupled to the light emitting region) is less than about 50% in order to reduce undesired second light deviations (such as unwanted reflections) of the light reflected from the object illuminated and passing back through the lightguide and layer or region comprising the light turning features.

In one embodiment, the light turning feature includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, a composite of symmetric or asymmetrically shaped materials, a laser ablated surface feature, an embossed surface feature, a coated surface feature, an injection molded surface feature, an extruded surface feature, and one of the aforementioned features positioned in the volume of the lightguide.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

Orientation of Light Within the Display

In one embodiment, a film-based lightguide illumination device illuminates a spatial light modulator (from the viewer side, from the side opposite the viewer, or from within the display) at a display illumination angle within the layer or material adjacent the electro-optical material or layer of the spatial light modulator in a first illumination plane. As used herein, the display illumination angle is defined as the angle of peak intensity from the surface normal of the spatial light modulating component or layer measured (or calculated) within the layer or material adjacent (on the viewer side) the spatial light modulating component or layer (such as for example, the electro-optical elements of an electrophoretic display, or liquid crystal layer in a liquid crystal display) in a first illumination plane. In one embodiment, the display illumination angle is less than one selected from the group: 60, 50, 40, 30, 20, 10, and 5 degrees. In one embodiment, the first illumination plane is parallel to the extended direction of the coupling lightguides. In another embodiment, the first illumination plane is perpendicular to the extended direction of the coupling lightguides.

In another embodiment, an adhesive layer adjacent to the recessed light extraction features permits a gas or air cavity of a low refractive index that causes light propagating within the lightguide (or material or layer that the extraction feature is formed within) to totally internally reflect at the interface between the lightguide (or material or layer that the extraction feature is formed within) and the gas or air cavity at the light extraction feature. For example, in one embodiment, a pressure sensitive adhesive layer is laminated onto a film-based lightguide including groove cavities in a core region of the lightguide such that there is an air gap for total internal reflection of the light within the lightguide at the extraction feature-air cavity interface. In another embodiment, the thickness of the adhesive layer adjacent one or more cavity based light extraction features is less than one selected from the group 2, 1.5, 1, 0.75, 0.5, 0.2, and 0.1 times the depth of the light extraction feature in the thickness direction of the film. In another embodiment, the thickness of the adhesive adjacent one or more cavity based light extraction features is less than one selected from the group: 200, 175, 150, 125, 100, 75, 60, 50, 40, 30, 20, and 10 micrometers. In another embodiment, the thickness of the cladding adjacent one or more cavity based light extraction features is less than one selected from the group: 200, 175, 150, 125, 100, 75, 60, 50, 40, 30, 20, and 10 micrometers.

In one embodiment, the full angular width at half maximum intensity of the light from the light source exiting the coupling lightguides is greater in a first plane including the thickness direction of the film than in a second plane including the direction orthogonal to the thickness direction. In one embodiment, the light output profile from the light source is rotated such that the collimation or plane including the lowest divergence is rotated or switched within the light mixing region, lightguide region, or light emitting region. In one embodiment, the light propagating within the film-based lightguide is redirected by light redirecting features, interior light directing edges or optical elements such that the full angular width at half maximum intensity of the light from the light source incident upon one or more light extraction features is greater in the second plane than in the first plane.

Light Emitting Device

In one embodiment, a light emitting device comprises: a film lightguide of a lightguide material with a lightguide refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first cladding layer comprising a first material with a first refractive index, $n_{D1}$, a second cladding layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide, wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In this embodiment, light propagating within the core layer or region of the film-based lightguide in the light emitting region that undergoes a low angle light redirection, such as by a low angle directing feature, will preferentially leak or exit the core layer or region of the lightguide on the side with the second refractive index since it is higher than the first refractive index and the critical angle is higher. In this embodiment, light deviating from angles higher than the critical angle to smaller angles to the normal of the film surface (or core-layer interface) will first pass the critical angle boundary on the side of the core layer or region optically coupled to the cladding layer or region with the higher refractive index than the cladding layer or region on the opposite side of the core region or layer.

In one embodiment, the low angle directing feature is configured to deviate light by a total angle of deviation less than a maximum first total angle of deviation, $\theta_f$, from the angle of incidence, following the equation: $\theta_f = \theta_{c2} - \theta_{c1}$, where $\theta_{c2}$ is the critical angle between the core layer or region and the second cladding layer or region and can also be expressed as $\theta_{c2} = \sin^{-1}(n_{D2}/n_{DL})$, and $\theta_{c1}$ is the critical angle between the core layer or region and the first cladding layer or region and can be expressed as $\theta_{c1} = \sin^{-1}(n_{D1}/n_{DL})$. In another embodiment, the low angle directing feature is configured to provide a maximum total angle of deviation, $\theta_{max}$ of less than 110% of the maximum first total angle of deviation or $\theta_{max} < 1.1 \times \theta_f$. In another embodiment, the low angle directing feature is configured to provide an average first total angle of deviation, $\theta_{fave}$, from the angle of incidence of $\theta_{fave} \theta_{c2} - \theta_{c1}$. In another embodiment, the low angle directing feature is configured to provide an average total angle of deviation, $\theta_{ave}$ of less than 110% of the average first total angle of deviation or $\theta_{ave} < 1.1 \times \theta_{fave}$.

For example, in one embodiment, the first material has a refractive index of $n_{D1} = 1.4$, the second material has a refractive index of $n_{D2} = 1.5$, and the core layer or region material has a refractive index of $n_{DL} = 1.6$. In this example, a low angle light directing feature comprises an angled reflective surface wherein the angle of the surface causes a total light deviation less than $\theta_f$ such that the light preferentially escapes the core layer of the lightguide through the higher index cladding layer or region. In this example, $\theta_{c1} = 61$ degree, $\theta_{c2} = 70$ degrees, and thus the maximum first total angle of deviation for optimum coupling into the second cladding region is less than 9 degrees. Since light reflecting from an angled surface undergoes a total angle of deviation of twice the angle of the feature, the angle of the features is chosen to be less than 4.5 degrees $$\left(\frac{\theta_f}{2}\right)$$

from the direction perpendicular to the thickness direction of the film at the feature. In one embodiment the average angle from a direction perpendicular to the thickness direction of the film at the feature of the surface of a reflective low angle directing feature receiving light propagating within the lightguide is less than $$\left(\frac{\theta_f}{2}\right)$$

degrees or less than $$1.1 \times \left(\frac{\theta_f}{2}\right)$$

degrees. In another embodiment, the thickness of the core layer or region of the film-based lightguide is less than 100 micrometers and the low angle directing feature directs (such as by reflection or refraction, for example) less than one selected from the group 100%, 80%, 60%, 40%, 30%, 20%, 10%, and 5% of the incident light in a single interaction (such as a single reflection or single refraction, for example). In a further embodiment, the light propagating within the lightguide that interacts with the low angle light directing features and propagates to the light turning features interacts with an average of more than 1, 2, 3, 4, 5, 10, 15, or 20 low angle directing features before reaching a light turning feature.

In one embodiment, the ratio of the length of the light emitting region in the direction of light propagating from the first side to the second side of the light emitting region to the average thickness of the light emitting region is greater than one selected from the group: 300, 500, 1000, 5,000, 7,000, 10,000, 15,000, and 20,000.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used, and the color may be controlled directly by modulating the light sources.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

The lightguides disclosed herein may be used to illuminate a reflective display. In one embodiment, a reflective display comprises a first reflective surface and a film-based lightguide comprising a plurality of coupling lightguides. In this embodiment, the reflective display may be a diffusely reflective spatial light modulator or a specularly reflecting spatial light modulator. For example, a diffusely reflective spatial light modulator can include a reflective display such as an electrophoretic particle based reflective display and a specularly reflecting spatial light modulator can include a reflective LCD with specularly reflecting rear electrodes. The reflective spatial light modulator, or a component of the light emitting device, lightguide, or a coating or layer positioned within, may include a light scattering or diffusive surface or volumetric light scattering particles or domains.

In one embodiment, the light emitting device is a frontlight for a watch that comprises a reflective display. In another embodiment, the largest dimension in a plane orthogonal to the thickness direction of the lightguide or display of the light emitting region is less than one selected from the group of 100, 75, 50, 40, 30, and 25 millimeters.

In one embodiment, a reflective display comprises a liquid crystal material positioned between a top linear absorbing polarizer and a bottom reflective polarizer (such as a wire-grid polarizer or multi-layer optical film polarizer such as DBEF™ film by the 3M Company). Depending on the type and configuration of the liquid crystal material, the polarization axis of the top linear absorbing polarizer may be oriented parallel, perpendicular, or at an angle between 0 degrees and 90 degrees to the reflective polarization axis of the reflective polarizer. In one embodiment, the rear reflecting polarizer is the rear electrode for the liquid crystal cell. In another embodiment, the reflective display with a rear reflective polarizer may be front-illuminated or back illuminated, such as by a film-based lightguide as disclosed herein. In one embodiment, the use of a frontlight with a reflective display with a rear reflective polarizer enables the rear reflective polarizer to help filter out undesired light not of the correct polarization more than a non-polarizing reflector and can increase the contrast of the reflective display. In one embodiment, the film-based lightguide is positioned between a top polarizer and a liquid crystal cell with a reflective polarizer positioned within the liquid crystal cell (or outside of the liquid crystal cell) on the opposite side of the liquid crystal material (or liquid crystal cell) than the film-based lightguide. In a further embodiment, the film-based lightguide is positioned above the linear absorbing polarizer of the reflective LCD.

Film-Based Lightguide Between Angularly Varying Diffusion Film and Reflective Spatial Light Modulator In one embodiment, a film-based lightguide is positioned between one or more angularly varying diffusion films (also known as a directional diffuser film or anisotropic diffuser film or layer) and the spatial light modulating layer(s) of a spatial light modulator (such as the liquid crystal layer in a reflective liquid crystal display). The angularly varying diffusion films comprise one or more axes of diffusion which scatter incident light about the one or more axes and substantially transmit un-deviated light from other angles. Angularly varying diffusion films (such as directional diffuser films/layers) with one more layers formed by one or more exposure methods are described, for example, in "Design of Light Diffusion Film with Bent Structure for Reflective Displays," Kentaro Kusama, Takahiro Ishinabe, Baku Katagiri, Tomoo Orui, Satoru Shoshi, Hideo Fujikake, Society for Information Displays, International Symposium, Digest of Technical Papers, Vol. 46, Issue 1, June 2015, p. 1629-1632; "Wide-Color-Gamut and Wide-Viewing-Angle Color Reflective LCD with Novel Anisotropic Diffusion Layer", T. Ishinabe, H. Fujikake, K. Kusama and S. Shoshi, SID International Symposium Digest of Technical Papers, Vol. 44-1, 350-353 (2013); Honda M., Hozumi S., Kitayama S. (1994) A Novel Polymer Film that Controls Light Transmission. In: Ghiggino K. P. (eds) Progress in Pacific Polymer Science 3. Springer, Berlin, Heidelberg; and K. Kusama, B. Katagiri, T. Orui and S. Shoshi, "Light-Diffusing Films Using Two-step UV Irradiation for Various Displays", SID International Symposium Digest of Technical Papers, Vol. 44-3, 1177-1180 (2013). Examples of angularly varying diffusion film include Lumisty® manufactured by Sumitomo Chemical Co., Ltd.

In one embodiment, a reflective LCD comprises one or more angularly varying diffusion films wherein the display is configured to provide optimum viewing contrast when illuminated by light ambient to the display at an angle within the range from −20 to −50 degrees in air from a first direction perpendicular to the outer surface of the display within a first plane parallel to the first direction. In this embodiment, the reflective display comprises an angularly varying diffusion film above the polarizer of the LCD (or between the polarizer and the liquid crystal layer) wherein the angularly varying diffusion film includes diffusion angles that that diffuse light incident from about −15 and +40 degrees (measured in air) from the first direction in the first plane. In one embodiment, the reflective LCD comprises a frontlight comprising a film-based lightguide wherein the lightguide is positioned between the angularly varying diffusion film and the liquid crystal layer (such as directly below the angularly varying diffusion film or below the polarizer in the display stack of layers). In one embodiment, light from a light source such as an LED exits the film-based lightguide toward the liquid crystal layer with a peak angle between 0 and −20 degrees (measured in air) from the first direction in the first plane or angle on the same side of the display normal as the peak axis of diffusion of the angularly varying diffuser. In another embodiment, light from a light source such as an LED exits the film-based lightguide toward the liquid crystal layer with an angular FWHM intensity between 5 and 30 degrees and the peak intensity may be centered at a peak angle of intensity between 0 and −20 degrees (measured in air) from the first direction in the first plane or angle on the opposite side of the display normal than the peak diffusion angle of the angularly varying diffuser. In one embodiment, the film-based lightguide is sufficiently thin so as to not significantly create parallax problems, shadows, or overlapping pixels in the display by increasing the distance between the top polarizer and the angularly varying diffuser. In one embodiment, the reflective display comprises a film-based lightguide below a varying angle diffuser film wherein the film-based lightguide is less than one selected from the group 200, 100, 75, 60, 50, 40, 30, and 25 micrometers thick. In another embodiment, light from a light source such as an LED exits the film-based lightguide toward the liquid crystal layer with a peak angle between 0 and +20 degrees (measured in air) from the first direction in the first plane or angle on the opposite side of the first direction than the peak axis of diffusion of the angularly varying diffuser.

Angular Profile of Light Emitting from the Light Emitting Device

In one embodiment, the light emitting from at least one surface of the light emitting device has an angular Full- Width at Half-Maximum (FWHM) intensity less than one selected from the group: 120 degrees, 100 degrees, 80 degrees, 60 degrees, 40 degrees, 20 degrees and 10 degrees. In another embodiment, the light emitting from at least one surface of the light emitting device has at least one angular peak of intensity within at least one angular range selected from the group: 0-10 degrees, 20-30 degrees, 30-40 degrees, 40-50 degrees, 60-70 degrees, 70-80 degrees, 80-90 degrees, 40-60 degrees, 30-60 degrees, and 0-80 degrees from the normal to the light emitting surface. In another embodiment, the light emitting from at least one surface of the light emitting device has two peaks within one or more of the aforementioned angular ranges and the light output resembles a "bat-wing" type profile known in the lighting industry to provide uniform illuminance over a predeter-mined angular range.

Reduced Parallax Reflective Display

In one embodiment, a reflective display comprises a spatial light modulator, a linear color filter array, a light source, and a lightguide formed from a film wherein the angular light output profile of the light exiting the lightguide in a light emitting region has an angular full-width at half maximum (FWHM) intensity less than one selected from the group of 20, 18, 15, 12, 10, and 7 degrees in a first light output plane comprising the thickness direction of the film and the array direction of the linear color filter array (such as an alternating array direction defining the color filter pattern RGBRGB or RGGBRGGB, for example). In one embodiment, the angular light output profile in the first light output plane is less than the angular FWHM intensity in a second light output plane (orthogonal to the first light output plane) comprising the thickness direction of the film and a direction perpendicular to the array direction of the linear array of color filters. In one embodiment, the angular light output profile of the light exiting the lightguide in a light emitting region has an angular full-width at half maximum (FWHM) intensity less than one selected from the group of 20, 18, 15, 12, 10, and 7 degrees in a first light output plane and a second light output plane. By reducing the angular light profile of the light exiting the light emitting region of the lightguide toward the reflective spatial light modulator, parallax problems from the color filter array can be reduced. Parallax problems can be created by input light passing through one color filter (such as a red color filter) and at least a portion of the light reflecting within the reflective spatial light modulator passing back through a second color filter (such as a blue color filter) and being absorbed. By using linear arrays of color filters and collimating the light output (or significantly reducing the angular FHWM intensity of the light output) in the first light output plane, more of the reflected light in the reflective SLM passes back through the same color filter (or neighboring color filter pixel or region of the same color).

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodi-ment, the input surfaces of the coupling lightguides are arranged to create a collective light input surface by trans-lation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region.

In one embodiment, a frontlight comprises an assembly of a plurality of layers including an intermediate film or layer (such as an adhesive layer) between a film comprising light turning features and film-based lightguide (such as a poly-carbonate layer). In this embodiment, the plurality of layers may be processed on a web such as a roll-to-roll process with the plurality of layers progressing in the web direction with a transverse direction orthogonal to the web direction and the thickness direction of the plurality of layers or film-based lightguide. In this embodiment, the film com-prising light turning features may be processed such the light turning features are linear light turning features linear in the web direction (or comprise features with sections linear in the web direction). In one embodiment, the film-based lightguide on the web of film is cut in linear sections that create lateral edges of coupling lightguides wherein the cuts include a linear section cut at a first cut angle to the transverse direction. In one embodiment, the first cut angle is one or more selected from the group: between 3 and 25 degrees, between 5 and 15 degrees; between 7 and 13 degrees, greater than 0 degrees, greater than 3 degrees, less than 25 degrees, greater that 5 degrees, and less than 20 degrees. In one embodiment, the plurality of layers are cut such that the cuts form one or more lateral edges along outer sides of the plurality of layers that define lateral edges of the light emitting region and optionally the light mixing region and outer lateral edges of outer coupling lightguides, and these lateral edges (or regions thereof) are oriented at the first cut angle to the transverse direction. In this embodi-ment, the resulting lateral edges of the plurality of layers corresponding to the light emitting region are oriented at the first cut angle to the transverse direction and the linear features or regions of the light turning features of the film comprising light turning features are oriented in the web direction. In this embodiment, when the plurality of layers (after cutting the lateral edges of the light emitting region on the web) are positioned on a reflective spatial light modu-lator with the lateral edges of the light emitting region aligned parallel with one or more sides, edges, or regions of the reflective spatial light modulator and/or active region of the reflective spatial light modulator, the linear features or regions of the light turning features of the film comprising light turning features are oriented at the first cut angle to the one or more sides of the reflective spatial light modulator and/or active region of the reflective spatial light modulator. Thus, in this embodiment, cutting the plurality of layers (including the film comprising the light turning features) at an angle positions the linear light turning features (or linear section of the light turning features) at a non-zero angle (such as the first cut angle) to one or more sides of the reflective spatial light modulator or to one or more sides/ edges of the active region of the reflective spatial light modulator) when the plurality of layers is positioned on the reflective spatial light modulator which can reduce the appearance of moiré in the active area of the display (since the pixels of the reflective spatial light modulator are ori-ented with the pixels arrayed parallel or perpendicular to the side of the reflective spatial light modulator or side of the active region of the reflective spatial light modulator. A further benefit to cutting the film-based lightguide to form cuts that define lateral edges of the coupling lightguides at the first cut angle to the transverse direction is that the optical quality of the edges formed from the cut (that become the lateral edges of the coupling lightguides) is increased and/or the degradation of the blades or dies making the cuts is reduced due to cut angle greater than 0 degrees to the transverse direction at which the die is cutting the plurality of layers (and/or the film-based lightguide) in a web-based cutting operation. In one embodiment, the film comprising the plurality of light turning features (and optionally the intermediate layer) is processed such that an edge closest to coupling lightguides (when the film comprising the light turning features is laminated or combined with the film-based lightguide comprising a plurality of coupling lightguides formed prior to or after the lamination or combination) is cut at a non-zero angle (such as the first cut angle) to the web direction of the web of film comprising the plurality of layers and also at an angle greater than 0 degrees (such as the first cut angle) to the linear light turning features or linear region of the light turning features. In the aforementioned embodiments, the intermediate layer and/or one or more additional layers may be included in one or more regions of the film (such as in the light emitting region, light mixing region, or region corresponding to the coupling lightguides) such as one or more layers or films selected from the group: adhesive layer, light redirecting film, hard-coating film or layer, polarizer, layer of the reflective spatial light modulator, cladding layer, carrier layer, substrate layer, protective layer, release liner, embossed layer, ultraviolet-cured microfeature layer, white layer or film such as a white release liner, black layer or film such as a black release liner, light redirecting element, second film-based lightguide, angularly varying diffusion film, and printed layer. In one embodiment, the cutting process or die that cuts the film-based lightguide at the first cut angle forming the lateral edges of the coupling lightguides also cuts the plurality of layers at the first cut angle to form one or more lateral edges of the resulting light emitting region and/or light mixing region defined by the cuts in the plurality of layers.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins or other counterparts are disposed on the folder to hold in place or guide one or more coupling lightguides or the lightguide during the folding step.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown).

Figure 2:
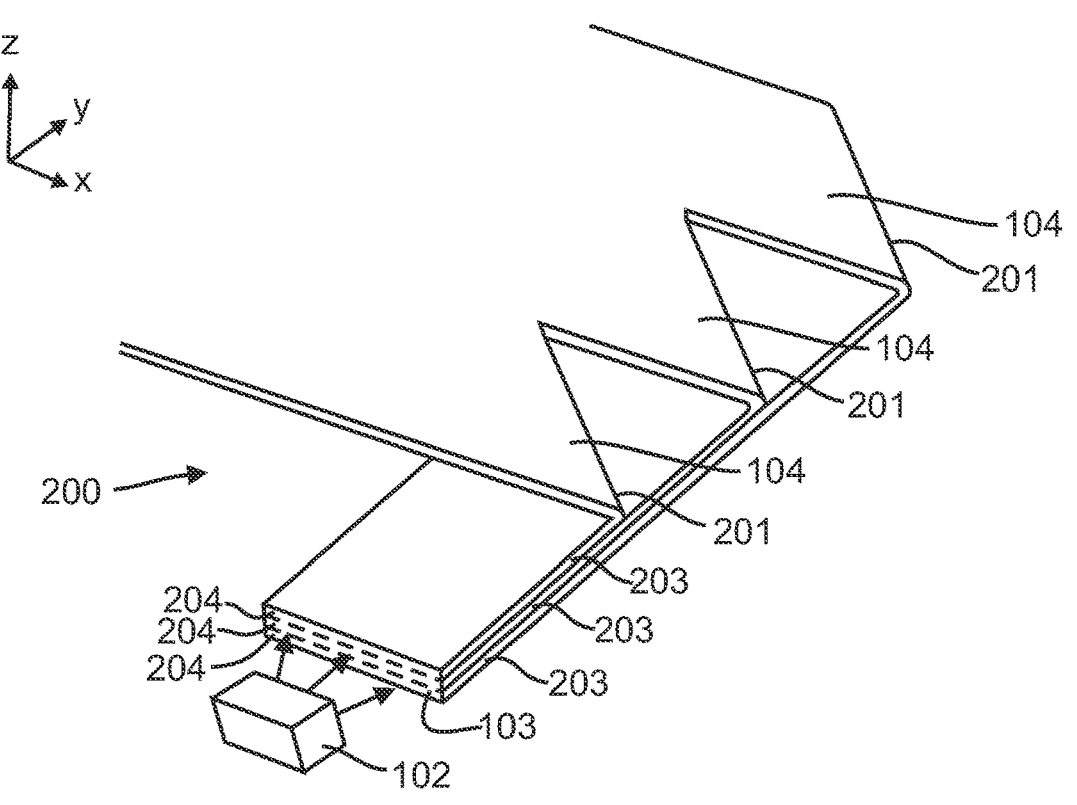
FIG. 2 is a perspective view of one embodiment of a light input coupler with coupling lightguides folded in the −y direction.

FIG. 2 is a perspective view of one embodiment of a light input coupler 200 with coupling lightguides 104 folded in the −y direction. Light from the light source 102 is directed into the light input surface 103 through or along input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction.

Figures 3, 4, 5:
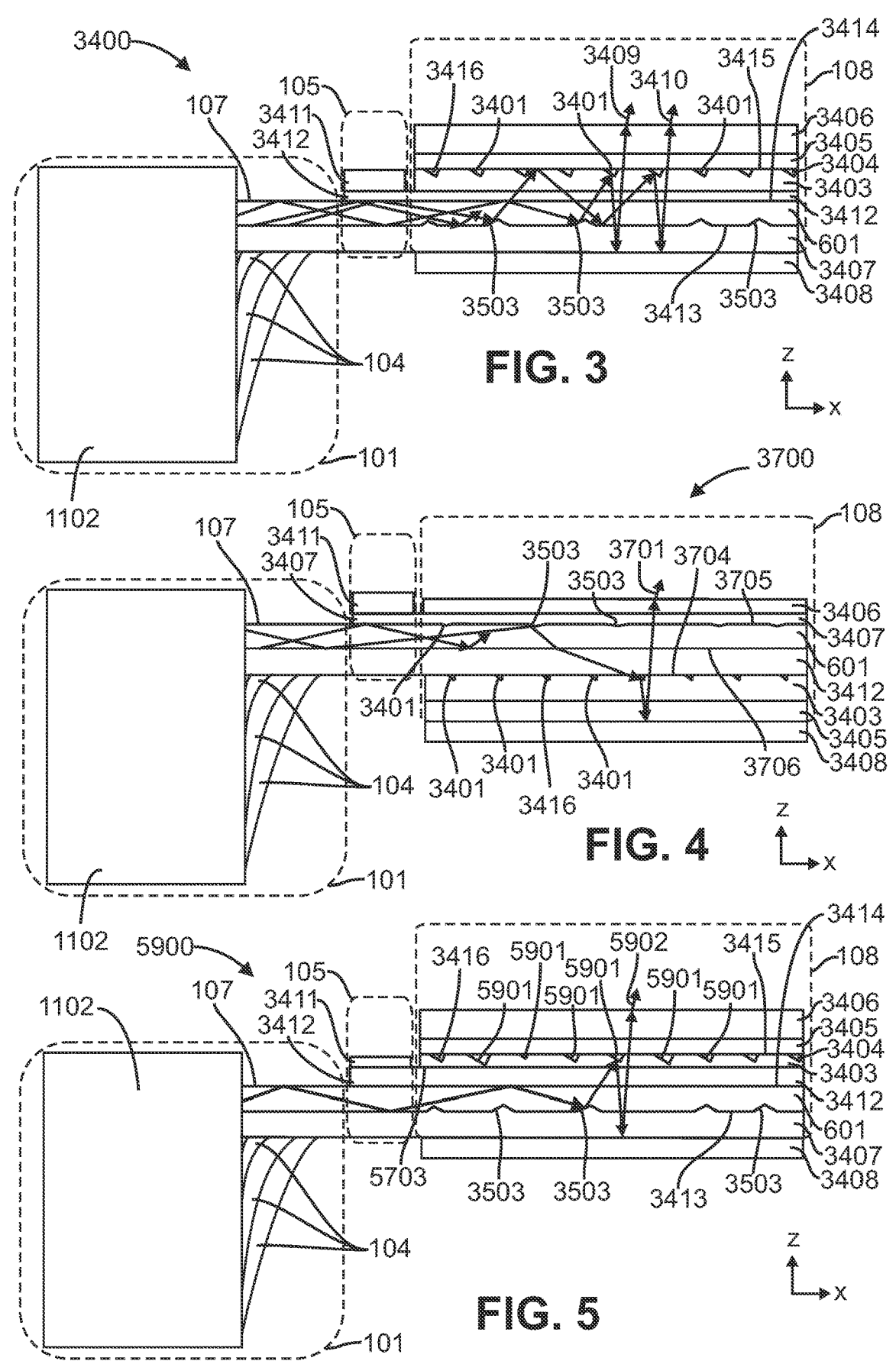
FIG. 3 is a cross-sectional side view of one embodiment of a light emitting device comprising low angle light directing features.
FIG. 4 is a cross-sectional side view of one embodiment of a light emitting device comprising light turning features and low angle directing features.
FIG. 5 is a cross-sectional side view of one embodiment of a light emitting device including varying depth light directing features to reduce the visibility of an angular shadow region.

FIG. 3 is a cross-sectional side view of one embodiment of a light emitting device 3400 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of reflective light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the reflective light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}$>$n_{D2}$>$n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

FIG. 4 is a cross-sectional side view of one embodiment of a light emitting device 3700 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the reflective light turning features 3401) using a second pressure sensitive adhesive layer 3412 comprising a second material with a second refractive index $n_{D2}$. The reflective spatial light modulator 3408 is optically coupled to the light turning film 3403 using a third pressure sensitive adhesive layer 3405. The light turning film 3403 comprises a plurality of reflective light turning features 3401 on the top surface 3705 of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index $n_{D1}$.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}$>$n_{D2}$>$n_{D1}$ such that the first light 3701 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3701 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3701 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3400 in the light emitting region 108.

FIG. 5 is a cross-sectional side view of one embodiment of a light emitting device 5900 comprising varying depth light turning features 5901 that vary in depth (have undulations or modulations of depth in the z direction along the length of the groove light directing feature in the y direction. The light emitting device has varying depth light turning features 5901 as a method for reducing the visibility of the angular shadow. Light 5902 reflects off of the varying depth light turning features 5901 in the −z direction toward the reflective spatial light modulator 3408 and also into larger angles in the x-y plane toward the y direction (the light 5902 spreads further in the lateral y direction (in and out of the page of FIG. 5) due to the angles of the surface of the varying depth light turning features 5901 created by varying the depth in the z direction along the length in the y direction of the varying depth light turning features 5901. By spreading more light toward the +y and/or −y direction in the example shown, more light is directed toward the excess width region or light can reflect from the varying depth groove light directing features so as to create a new virtual origin and direction of light such that it indirectly appears to originate from the excess width region and reduces angular shadow visibility (increases the relative luminance in the shadow region). In a similar embodiment, the location groove may modulate or vary in the x direction along the groove oriented in the y direction (or at angle to the y direction) such that the surfaces of the groove spread more light in the lateral plane (x-y plane) toward the +y and/or −y directions as shown and toward the excess width regions.

FIG. 6 is a side view of a portion of one embodiment of a reflective display 7900 comprising an angularly varying diffusion film 7904 and a film based lightguide 107. The film-based lightguide 107 is positioned in the display stack between the liquid crystal layer 7902 and the angularly varying diffusion film 7904. In this embodiment, ambient light 7909 propagates into the angularly varying diffusion film 7904 (where it refracts upon entering the surface, but is substantially un-diffused), propagates through the film-based lightguide 107, through the linear polarizer 7901, propagates through the liquid crystal layer 7902, reflects from the reflective layer 7903 of the reflective display 7900 (such as a rear electrode), propagates back through the liquid crystal layer 7902, back through the linear polarizer 7901, back through the film-based lightguide 107, and is diffused while passing through the angularly varying diffusion film 7904 which diffuses incident light with a peak diffusion axis from the first direction 7905 perpendicular to the outer surface 7908 of the reflective display 7900. In this embodiment, light 7906 propagates in the +x direction in the film-based lightguide by total internal reflection and is extracted out of the film-based lightguide as light 7907 propagating on the opposite side of the first direction 7905 than the ambient light 7909 in the first plane (x-z plane) through the linear polarizer 7901, propagates through the liquid crystal layer 7902, reflects from the reflective layer 7903 of the reflective display 7900 (such as a rear electrode), propagates back through the liquid crystal layer 7902, through the linear polarizer 7901, through the film-based lightguide 107, and is diffused while passing through the angularly varying diffusion film 7904 which diffuses incident light with a peak diffusion axis from the first direction 7905 perpendicular to the outer surface 7908 of the reflective display 7900. The reflective display 7900 or the film-based lightguide 107 may include or have other layers optically coupled to the film-based lightguide 107 or reflective display (or a component or layer thereof) such as a light redirecting optical elements or layer, adhesive layers, cladding layers, core layer, additional film-based lightguides, turning film, light turning features, light extracting features, light mixing region, light source, coupling lightguides, low angle directing features, additional polarizer (such as a "clean-up" polarizer positioned above the angularly varying diffusion film 7904), compensation films, touchscreen layers, protective layers, hardcoating layers, protective lenses, index-matching layers, etc. such as disclosed elsewhere herein.

FIG. 7 is a cross-sectional side view of one embodiment of a light emitting device 3710 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the reflective light turning features 3401) using a second pressure sensitive adhesive layer 3412 comprising a second material with a second refractive index $n_{D2}$. The reflective spatial light modulator 3408 comprises a color filter layer 3711 positioned above a spatial light modulating layer 3712. The color filter layer 3711 comprises an array of color filters linear in the y-direction and arrayed in the x direction that absorb spectral regions of incident light such that the transmitted light is red (R), green (G), or blue (B) as shown in FIG. 37. The reflective spatial light modulator is optically coupled to the light turning film 3403 using a third pressure sensitive adhesive layer 3405. The light turning film 3403 comprises a plurality of reflective light turning features 3401 on the top surface 3705 of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index $n_{D1}$.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3701 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3701 propagates into the light turning film 3403 and totally internally reflects from a light turning feature 3401 in the light turning film 3403 to an angle less than 25 degrees from the thickness direction (parallel to the z direction in this embodiment) of the film-based lightguide 107 in the x-z plane. The first light 3701 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3400 in the light emitting region 108. In one embodiment, the frontlight uses face-coupled, or edge-coupled without strips to couple light from a lightguide into the film-based lightguide 107. In this embodiment, the first light 3701 has an angular light output profile exiting the lightguide in a light emitting region with an angular full-width at half maximum (FWHM) intensity less than 25 degrees in a first light output plane comprising the thickness direction (z direction) of the film and the array direction of the linear color filter array (x direction).

FIG. 8 is a top view (looking at the x-y plane) of a portion of a front lit reflective display 4000 comprising a color filter layer 3610 comprising a linear array of color filters 3612 in a red (R), green (G), and blue (B), color format arrayed in the x direction, a film-based lightguide frontlight comprising a film-based lightguide 107, and a reflective spatial light modulator 4002 (such as a reflective electrophoretic display or reflective LCD) comprising an array of pixels 4001 that can be spatially modulated. In this embodiment, the light propagating through the film-based lightguide 107 entering into the light emitting region has an optical axis 3811 oriented perpendicular to the array direction (x-direction) of the array of color filters (parallel to the −y-axis), or oriented with a directional component in the −y direction or a directional component in a direction orthogonal to the array direction of the array of color filters 3612. In this embodiment, the light entering the light emitting region with a directional component in the −y direction has a has an angular full-width at half maximum (FWHM) intensity 3812 less than one selected from the group of 20, 18, 15, 12, 10, and 7 degrees in the plane (x-y plane) orthogonal to the thickness direction of the film-based lightguide 107 and exits the light emitting region of the film-based lightguide frontlight toward the reflective spatial light modulator 4002 with an angular FWHM intensity in the first output plane (x-z plane in FIG. 8) comprising the thickness direction (z-direction out of the plane of the drawing) of the film-based lightguide 107 and the array direction (x direction) of the linear array of color filters 3612 less than one selected from the group of 20, 18, 15, 12, 10, and 7 degrees. In this embodiment, the front lit reflective display 4000 may comprise a light source and a light collimating optical element, low angle directing features and light turning features, or other collimating or angular width reduction method disclosed herein to reduce the angular FWHM intensity 3812 of the light entering the light emitting region 108 and the angular FWHM intensity of the light exiting the light emitting region 108 in the first output plane (x-z plane) toward the color filter layer 3610 and reflective spatial light modulator 4002. In one embodiment, the front lit reflective display 4000 further comprises an array of coupling lightguides arrayed in the x direction parallel to the array direction of the array of color filters 3612 extending from a light mixing region of the film-based lightguide 107.

Figure 9:
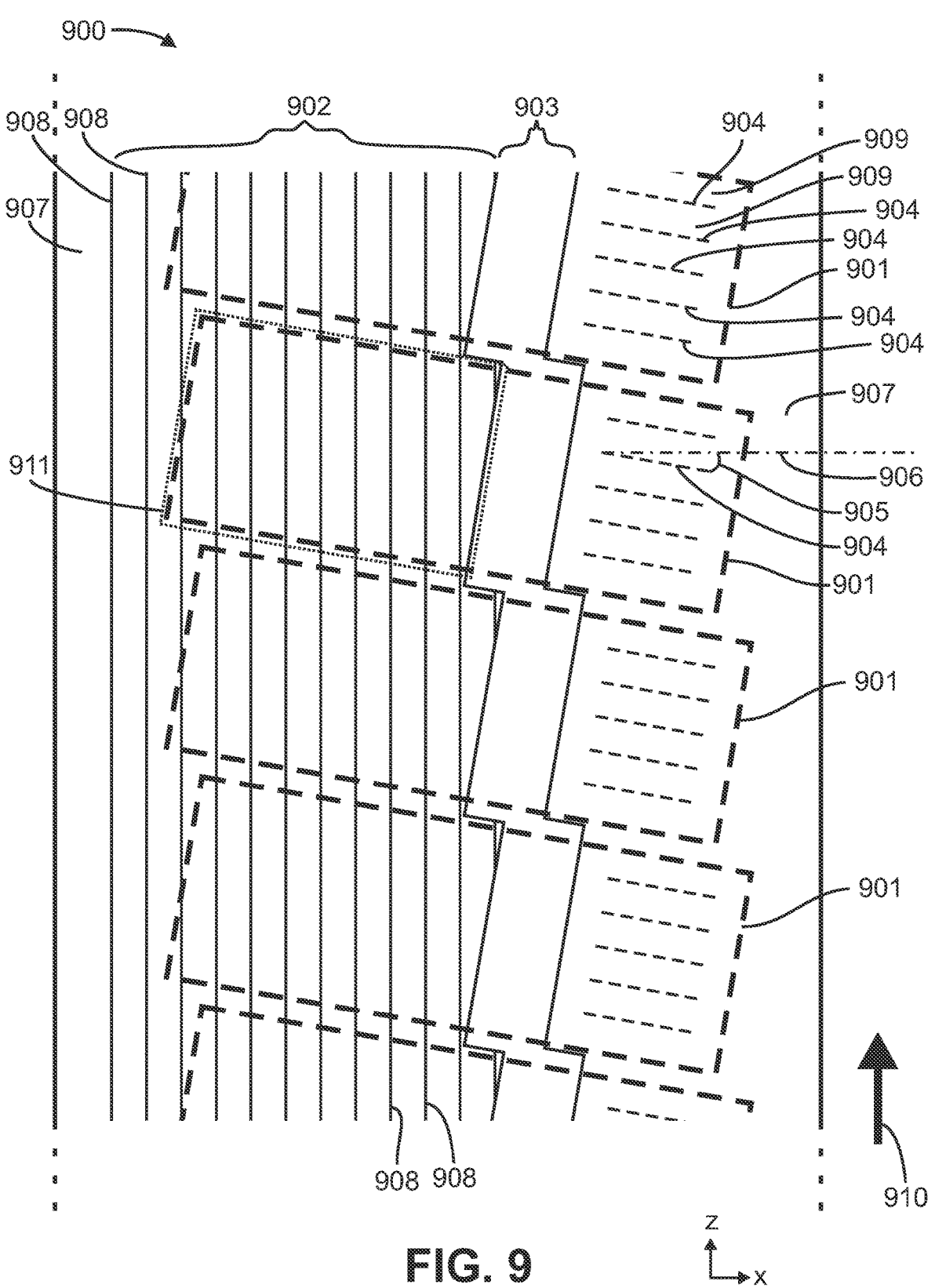
FIG. 9 is a top view of a film assembly comprising plurality of layers comprising an intermediate layer between a film comprising linear light turning features, and a film-based lightguide.

FIG. 9 is a top view of a film assembly comprising a plurality of layers 900 comprising an intermediate layer 903 between (in the y direction out of the page and shown exposed between in the x-direction) a film 902 comprising linear light turning features 908, and a film-based lightguide 907. The linear light turning features 908 are linear (and parallel to each other) in the web direction 910 (parallel to the +z direction) in which the plurality of layers 900 (or film comprising the plurality of layers 900) is progressing on a roll-to roll processing system (not shown). In this embodiment, the film-based lightguide 907 is cut in linear sections 904 that create lateral edges of coupling lightguides 909 wherein the cuts include a linear section cut at a first cut angle 905 to the transverse direction 906. In this embodiment, the plurality of layers 900 are also cut such that the cuts form one or more lateral edges 901 along outer sides of the plurality of layers 900 that define lateral edges of the light emitting region and optionally the light mixing region and outer lateral edges of outer coupling lightguides 909, and these lateral edges 901 (or regions thereof) are oriented at the first cut angle 905 to the transverse direction 906. In this embodiment, the resulting lateral edges 901 of the plurality of layers 900 corresponding to the light emitting region are oriented at the first cut angle 905 to the transverse direction 906 and the linear light turning features 908 of the film 902 comprising light turning features 908 are oriented in the web direction 910. In this embodiment, when the plurality of layers 900 (after cutting the plurality of layers 900 to form the lateral edges 901 of the light emitting region and lateral edges of the film-based frontlight formed from the plurality of layers 900) are positioned on a reflective spatial light modulator 911 (the corresponding edges of the reflective spatial light modulator are shown as dotted lines 911) with the lateral edges 901 of the light emitting region aligned parallel with one or more sides, edges, or regions of the reflective spatial light modulator 911 and/or active region of the reflective spatial light modulator 911, the linear features 908 of the film 902 comprising light turning features 908 are oriented at the first cut angle 905 to the one or more sides of the reflective spatial light modulator 911 and/or active region of the reflective spatial light modulator 911.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein. While the disclosure includes various specific embodiments, those skilled in the art will recognize that the embodiments can be practiced with modification within the spirit and scope of the disclosure and the claims.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

EQUIVALENTS

Those skilled in the art will recognize or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius. Unless otherwise stated, refractive indexes referenced herein are measured at the yellow doublet sodium D-line, with a wavelength of 589 nanometers. Elements in the figures are not drawn to scale.

What is claimed is:

1. A method of manufacturing a film assembly comprising:
   forming a roll of a film-based lightguide comprising a lightguide region and having opposing faces with a thickness in a thickness direction between the opposing faces less than 0.5 millimeters;
   forming light emitting regions on the film-based lightguide defined by light extracting features configured to extract light propagating by total internal reflection in the film;
   adding a layer comprising linear light turning features to the film-based lightguide while the film-based lightguide is moving in a web direction of the roll of the film-based lightguide such that the light turning features are oriented in the web direction of the film-based lightguide; and
   cutting the film-based lightguide and the layer in a plurality of linear sections while the film-based lightguide is moving in a web direction, the plurality of linear sections comprises linear sections that define lateral edges of the light emitting region of the film-based lightguide, wherein the plurality of linear sections are cut at first cut angle between 3 degrees and 25 degrees to a transverse direction of the film-based lightguide orthogonal to the web direction and the thickness direction.

2. The method of manufacturing a film assembly of claim 1 wherein the first cut angle is an angle between 5 and 15 degrees to the transverse direction.

3. The method of manufacturing a film assembly of claim 2 wherein the plurality of linear sections further comprise linear sections cut at the first cut angle that define lateral edges of coupling lightguides extending from the lightguide region of the film-based lightguide.

4. The method of manufacturing a film assembly of claim 3 wherein the plurality of linear sections further comprise linear sections cut at the first cut angle that define lateral edges of a light mixing region of the film-based lightguide between the light emitting region and the coupling lightguides.

5. The method of manufacturing a film assembly of claim 1 wherein the film assembly comprises an adhesive layer positioned between the film-based lightguide and the layer comprising linear light turning features and cutting the film-based lightguide and layer further cuts the adhesive layer.

6. The method of manufacturing a film assembly of claim 5 wherein adding a layer comprising linear light turning features comprises adhering the layer to the film-based lightguide using the adhesive layer.

7. A method of manufacturing a film assembly comprising:
   forming a film-based lightguide comprising a lightguide region and having opposing faces with a thickness in a thickness direction between the opposing faces less than 0.5 millimeters;
   adding a layer comprising linear light turning features to the film-based lightguide while the film-based lightguide is moving in a web direction of the film such that the linear light turning features are oriented in the web direction of the film-based lightguide; and
   cutting the film-based lightguide while the film-based lightguide is moving in a web direction in a plurality of linear sections, the plurality of linear sections comprises linear sections that define lateral edges of coupling lightguides extending from the lightguide region of the film-based lightguide,
   wherein the linear sections are cut at first cut angle between 3 degrees and 25 degrees to a transverse direction of the film-based lightguide orthogonal to the web direction and the thickness direction.

8. The method of manufacturing a film assembly of claim 7 wherein the first cut angle is an angle between 5 and 15 degrees to the transverse direction.

9. The method of manufacturing a film assembly of claim 7 wherein the first cut angle is an angle between 7 and 13 degrees to the transverse direction.

10. The method of manufacturing a film assembly of claim 7 wherein the plurality of linear sections further comprise linear sections cut at the first cut angle that define lateral edges of a light emitting region of the film-based lightguide comprising light extraction features.

11. The method of manufacturing a film assembly of claim 10 wherein the plurality of linear sections further comprise linear sections cut at the first cut angle that define lateral edges of a light mixing region of the film-based lightguide between the light emitting region and the coupling lightguides.

12. The method of manufacturing a film assembly of claim 7 wherein the film-based lightguide comprises an adhesive layer positioned between the film-based lightguide and the layer comprising linear light turning features and cutting the film-based lightguide further comprises cutting the layer comprising linear light turning features and the adhesive layer.

13. The method of manufacturing a film assembly of claim 12 wherein adding a layer comprising linear light turning features comprises adhering the layer to the film-based lightguide using the adhesive layer.

14. A film assembly comprising:

a film-based lightguide comprising a lightguide region and having opposing faces with a thickness in a thickness direction between the opposing faces less than 0.5 millimeters;

a layer comprising linear light turning features oriented in a web direction of the film-based lightguide; and a plurality of cut linear sections comprising cut linear sections that define lateral edges of coupling lightguides extending from the lightguide region of the film-based lightguide, wherein the plurality of cut linear sections are cut at first cut angle between 3 degrees and 25 degrees to a transverse direction orthogonal to the web direction and the thickness direction.

15. The film assembly of claim 14 wherein the first cut angle is an angle between 5 and 15 degrees to the transverse direction.

16. The film assembly of claim 14 wherein the plurality of cut linear sections comprises cut linear sections cut at the first cut angle that define lateral edges of a light emitting region of the film-based lightguide comprising light extracting features.

17. The film assembly of claim 16 further comprising a light mixing region of the film-based lightguide between the light emitting region and the coupling lightguides, wherein the plurality of cut linear sections comprises cut linear sections cut at the first cut angle that define lateral edges of the light mixing region.

18. A frontlight comprising the film assembly of claim 17 further comprising at least one light source positioned to emit light into the film-based lightguide that propagates in the film-based lightguide by total internal reflection.

19. A reflective display comprising the frontlight of claim 18 and a reflective spatial light modulator, wherein the lateral edges of the light emitting region are parallel to a side of the reflective spatial light modulator.

20. A reflective display comprising the frontlight of claim 18 wherein the film assembly is adhered to a reflective spatial light modulator such that the linear light turning features are oriented at the first cut angle to one or more sides of the reflective spatial light modulator.

* * * * *